United States Patent [19]

Teige et al.

[11] 4,097,444
[45] Jun. 27, 1978

[54] PROCESS FOR THE DYEING OF WATER-INSOLUBLE THERMOPLASTIC POLYMERS AND POLYCONDENSATES IN THE MASS

[75] Inventors: Wolfgang Teige, Kelkheim, Taunus; Rudolf Schickfluss, Frankfurt am Main, both of Germany

[73] Assignee: Hoechst Aktiengesellschaft, Frankfurt am Main, Germany

[21] Appl. No.: 772,573

[22] Filed: Feb. 28, 1977

[30] Foreign Application Priority Data

Mar. 2, 1976 Germany .............................. 2608482

[51] Int. Cl.² ................................................ C08K 5/35
[52] U.S. Cl. ............................. 260/40 P; 260/37 NP; 260/42.21
[58] Field of Search .............. 260/307 C, 240 F, 40 P, 260/42.21, 37 NP

[56] References Cited

U.S. PATENT DOCUMENTS

| | | | |
|---|---|---|---|
| 2,571,319 | 10/1951 | Waters et al. | 260/40 P X |
| 3,489,713 | 1/1970 | Bowman et al. | 260/40 P |
| 3,793,341 | 2/1974 | Genta | 260/40 P X |

FOREIGN PATENT DOCUMENTS 2,225,546  12/1973  Germany.

OTHER PUBLICATIONS

*Modern Plastics Encyclopedia* – 1967, Sep. '66/vol. 44, No. 7A p. 459.

*Primary Examiner*—Sandra M. Person

*Attorney, Agent, or Firm*—Curtis, Morris & Safford

[57] ABSTRACT

Process for the dyeing of a water-insoluble thermoplastic polymer or polycondensate in mass, which comprises adding to the said thermoplastic material before the final molding thereof, an azlactone dyestuff of the formula (1)

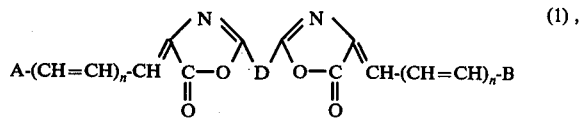

in which A and B each represents phenyl, lower alkyl-phenyl, lower alkoxy-phenyl, chlorophenyl, nitrophenyl, cyanophenyl, lower alkyl—O—C—phenyl, lower alkyl—C—O—phenyl,
$\quad\quad\quad\quad\quad\ \ \|\quad\quad\quad\quad\quad\quad\quad\quad\ \|$
$\quad\quad\quad\quad\quad\ \ O\quad\quad\quad\quad\quad\quad\quad\quad O$ methylene-dioxy-phenylene or naphthyl, A and B being identical or different, D represents phenylene, lower alkyl-phenylene, di-lower alkoxy-phenylene, monochlorophenylene, dichlorophenylene, biphenylene or naphthylene, and *n* represents the integer 0 or 1, or a mixture of dyestuffs of the said formula (1), the dyeings so obtained representing brilliant yellow dyeings of high tinctorial strength being distinguished by very good fastness to light, rubbing and ironing, and, particularly, by an outstanding stability toward heat.

6 Claims, No Drawings

PROCESS FOR THE DYEING OF WATER-INSOLUBLE THERMOPLASTIC POLYMERS AND POLYCONDENSATES IN THE MASS

The present invention relates to a process for the dyeing of water-insoluble thermoplastic polymers and polycondensates in the mass.

The subject of the present invention is a process for the dyeing of water-insoluble thermoplastic polymers and polycondensates in the mass, which comprises dyeing the above-mentioned thermoplastic materials, prior to their final shaping, with an azlactone dyestuff of the general formula (1)

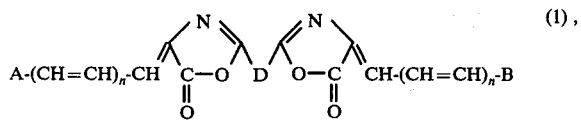

in which A and B represent identical or different naphthyl radicals and/or phenyl radicals, which may be substituted by halogen atoms, preferably chlorine or bromine atoms, alkyl$_{C_1-C_4}$—, alkoxy$_{C_1-C_4}$—, nitro, hydroxyl, cyano, alkyl$_{C_1-C_4}$—O—OC—, methylenedioxy and/or alkyl$_{C_1-C_4}$—COO groups, D is a bi-phenylene, naphthylene or phenylene radical which may be substituted by halogen atoms, preferably chlorine or bromine atoms, alkyl $_{C_1-C_4}$— and/or alkoxy$_{C_1-C_4}$— groups, and $n$ is the integer 0 or 1, or with a mixture of dyestuffs of the above-mentioned formula (1) in the mass.

The alkyl groups mentioned in the definition of the general formula (1) and having 1 to 4 carbon atoms may be branched or straight-chained.

Of the water-insoluble thermoplastic polymers and/or polycondensates, there may be mentioned polystyrene, polymethacrylate, polyamide, unplasticized polyvinyl chloride and especially linear polyesters, such as polyethylene-glycol-terephthalate.

According to the process described in German Offenlegungsschrift No. 2,225,546, the dyestuffs of the general formula (1) to be used in accordance with the invention may be obtained by condensing aroylbisglycines of the general formula (2)

HOOC—H$_2$C—HN—OC—D—CO—NH—CH$_2$—COOH (2)

with aldehydes of the general formulae

A—(CH=CH)$_n$—CHO (3)

and

B—(CH=CH)$_n$—CHO (3a), while water is being split off.

Instead of the aroylbisglycines of the general formula (2), there may also be used bisazlactones of the general formula (4).

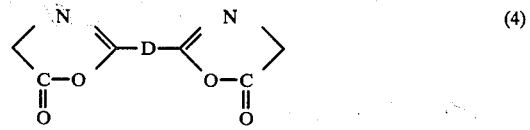

In the general formulae (2) through (4), A, B, D and $n$ are defined as above, the meanings of A and B being identical as a rule, but they may also be different.

The azlactone dyestuffs described herein are particularly suitable for the dyeing in the mass, especially the spun dyeing, since they show an excellent heat resistance up to temperatures of 300° C.

In order to carry out the process of the invention, the above-specified dyestuffs may be added to the starting compounds in the condensation for the preparation of the polycondensates, such as polyesters. In the preparation of the dyeings it is also possible to apply dyestuffs onto the ready-made and not yet shaped polymers and/or polycondensates, such as polyester materials, for example by powdering or mixing, and to subject the material thus treated thereafter to a melting process, in order to effect the final mixing and shaping. For the shaping, the polymers and/or polycondensates dyed in this manner, such as polyester materials, may be spun, for example, into filaments, extruded into sheets or injection-molded into a determined shape from the melt by means of well known equipment.

The dyestuff content of the materials dyed according to the invention depends on the desired color depth. Generally, an amount of dyestuff is used which is in the range of from about 0.05 to 3%, calculated on the weight of the thermoplastic material.

With the dyestuffs used, the common methods of dyeing in the mass yield brilliant yellow dyeings of a good color depth which show very good fastness properties with regard to light and rubbing, an excellent fastness to thermosetting and especially an outstanding heat resistance.

The following Examples serve to illustrate the invention.

EXAMPLE 1

10 Parts by weight of the dyestuff of the formula

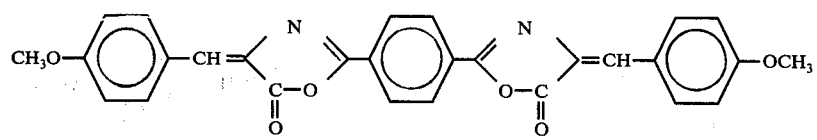

are ground with 90 parts by weight of ethylene-glycol for 30 minutes in a bead mill. 5 Parts by weight of this paste are mixed with 95 parts by weight of bis-(β-hydroxyethyl)-terephthalate and are condensed in the course of 6 hours in vacuo at a temperature in the range of from 270° to 280° C. the polyester material obtained is granulated and spun into filaments according to common methods. Brilliant yellow dyeings are obtained which show a very good fastness to thermosetting and light. If instead of the above-specified dyestuff there is used, for example, a dyestuff of the formula

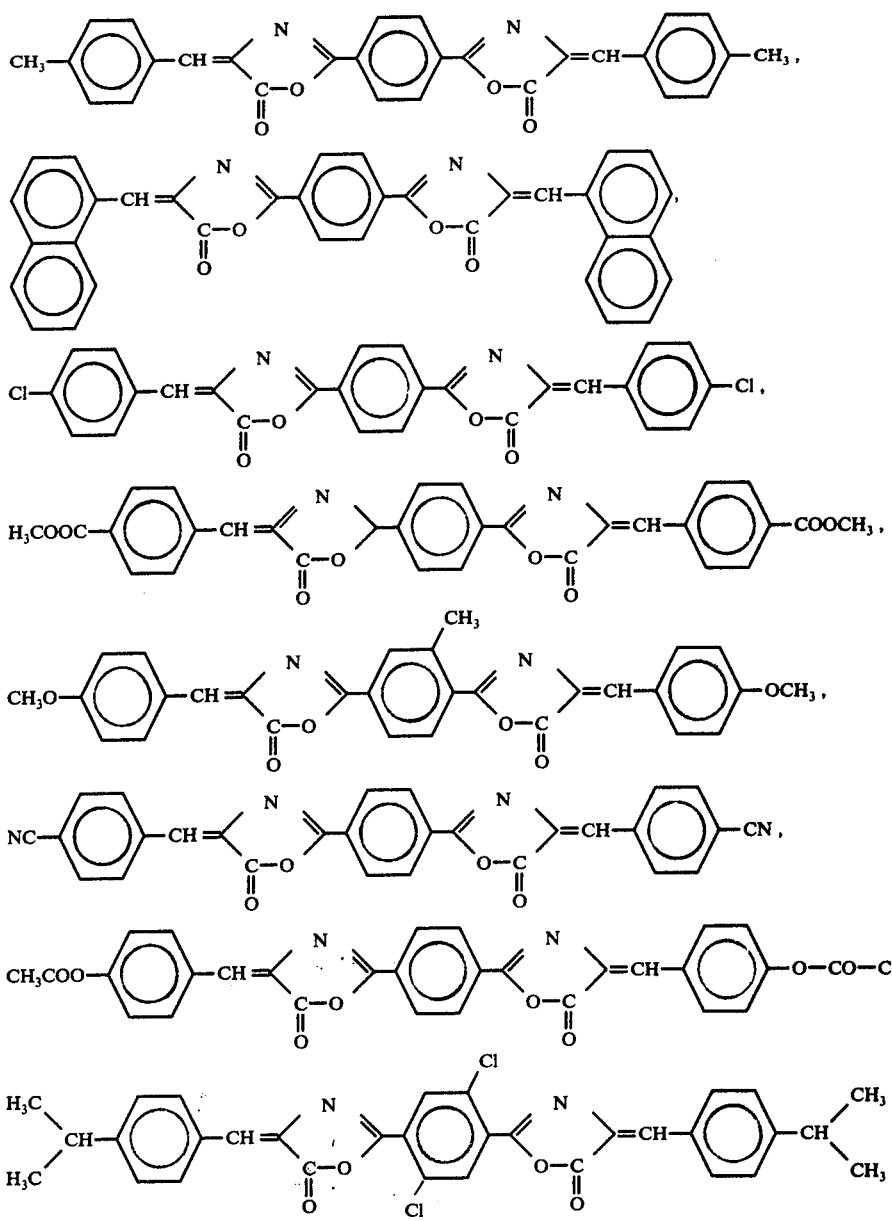
or, for example, a mixture of the dyestuffs of the formulae
brilliant yellow dyeings are also obtained which show very good fastness properties.
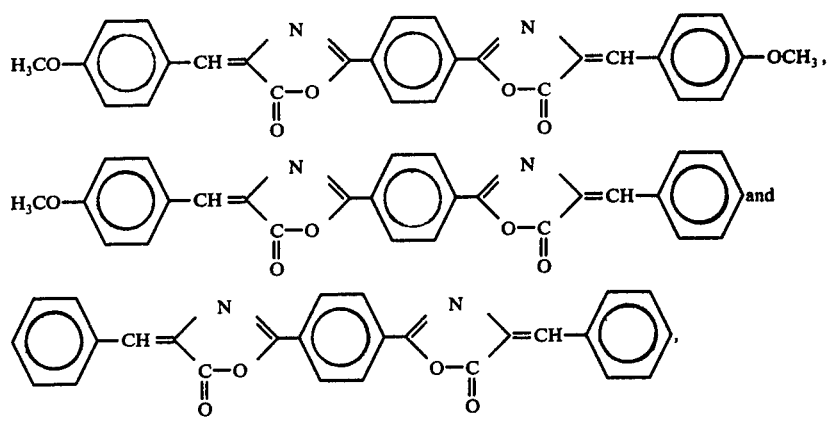

EXAMPLES 2

1 Part by weight of the dyestuff of the formula

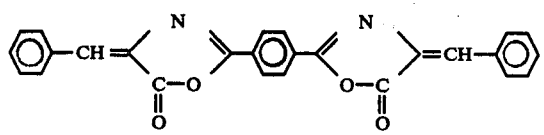

is mixed with 99 parts by weight of granules of poly-1,4-dimethylol-cyclohexane-terephthalate and spun from the melt. Brilliant yellow-colored filaments are obtained. The dyeings are marked by very good fastness properties with regard to thermosetting and light. If instead of the above-specified dyestuff there is used, for example, a dyestuff of the formula

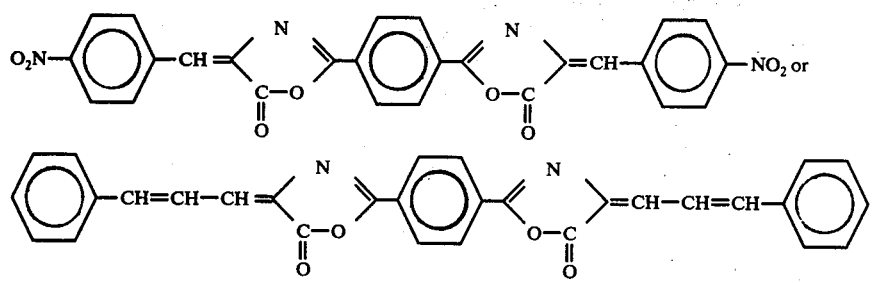

or, for example, a mixture of the dyestuffs of the formulae

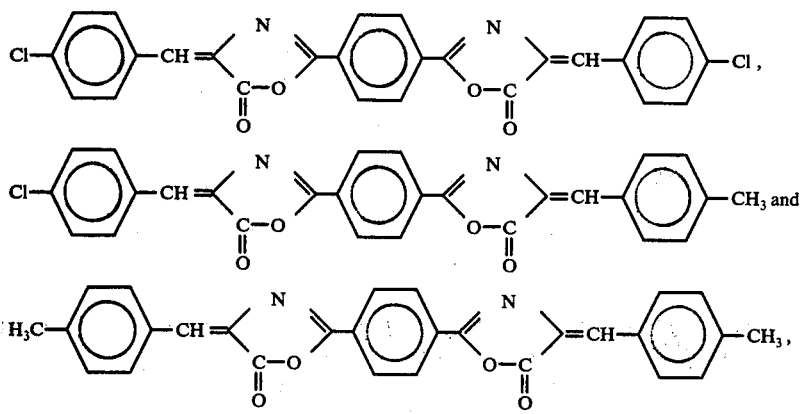

brilliant yellow dyeings are also obtained which show very good fastness properties.

EXAMPLE 3

99 Parts by weight of polyethylene-glycol-terephthalate are dyed according to Example 2 with 1 part by weight of the dyestuff of the formula

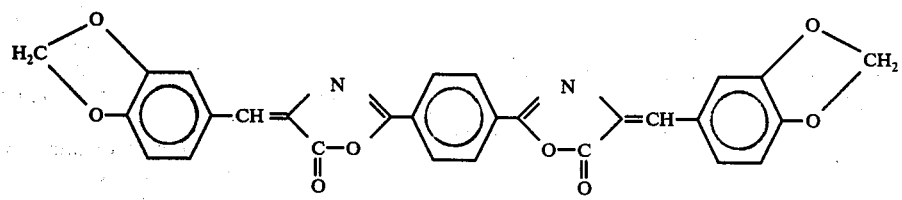

Brilliant yellow dyeings are obtained which show excellent fastness properties.

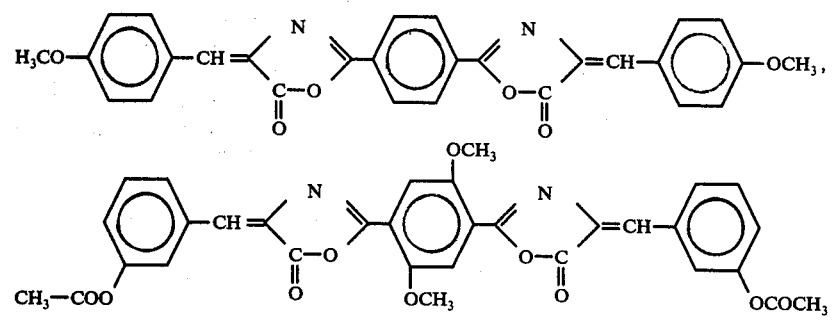

If instead of the above-specified dyestuff there is used a dyestuff of the formula